(12) United States Patent
Varela et al.

(10) Patent No.: US 6,676,228 B1
(45) Date of Patent: Jan. 13, 2004

(54) VEHICLE WHEEL END ASSEMBLY WITH SUPPORT TUBE

(75) Inventors: Tomaz Dopico Varela, Gahanna, OH (US); Steven E. Hunter, Lancaster, OH (US)

(73) Assignee: ArvinMeritor Technology, LLC, Troy, MI (US)

(*) Notice: Subject to any disclaimer, the term of this patent is extended or adjusted under 35 U.S.C. 154(b) by 0 days.

(21) Appl. No.: 10/216,500

(22) Filed: Aug. 9, 2002

(51) Int. Cl.$^7$ ................ B60B 35/16; B60B 19/00; B60B 37/00
(52) U.S. Cl. ................ 301/137; 301/6.1; 301/124.1
(58) Field of Search ................ 301/6.1, 6.7, 124.1, 301/137

(56) References Cited

U.S. PATENT DOCUMENTS

| | | | | |
|---|---|---|---|---|
| 1,019,755 A | * | 3/1912 | Brush | 384/589 |
| 1,955,824 A | * | 4/1934 | Mogford et al. | 74/607 |
| 1,988,594 A | * | 1/1935 | Heinze | 188/366 |
| 2,773,552 A | * | 12/1956 | Schjolin et al. | 180/370 |
| 4,496,016 A | * | 1/1985 | Unsworth et al. | 180/53.6 |
| 4,986,608 A | * | 1/1991 | Fett | 301/124.1 |
| 4,991,992 A | * | 2/1991 | Gutfleisch | 403/359.2 |
| 5,056,634 A | * | 10/1991 | Shiba et al. | 192/40 |
| 6,017,097 A | * | 1/2000 | Weir, III | 301/105.1 |
| 6,022,083 A | * | 2/2000 | Brookins | 301/124.1 |
| 6,102,489 A | * | 8/2000 | Boese et al. | 301/137 |

* cited by examiner

*Primary Examiner*—S. Joseph Morano
*Assistant Examiner*—Jason R. Bellinger
(74) *Attorney, Agent, or Firm*—Carlson, Gaskey & Olds

(57) ABSTRACT

A wheel end assembly includes an output shaft mounted to a wheel hub for driving a vehicle wheel. The output shaft is driven by a gear assembly mounted within a gear housing and operably coupled to an input shaft. The gear assembly includes an input gear driven by the input shaft, intermediate gears in meshing engagement with the input gear, and an output gear in meshing engagement with the intermediate gears. A tube has one end press-fit into the gear housing with an opposite end extending into a wheel hub cavity. Bearings are mounted directly between the tube and the wheel hub to support the wheel hub for rotation relative to the tube. The output shaft is received within the tube with an inboard end in direct driving engagement with the output gear and with an outboard end directly mounted to the wheel hub.

25 Claims, 3 Drawing Sheets

VEHICLE WHEEL END ASSEMBLY WITH SUPPORT TUBE

BACKGROUND OF THE INVENTION

This invention relates to wheel end assembly, and more particularly to a wheel end assembly for an inverted portal axle as used in a mass transit vehicle.

Mass transit vehicles, such as trolley cars, buses, and the like typically have seats aligned at the lateral sides of the vehicle, with a central aisle and floor extending along the vehicle. In order to facilitate entering and exiting from the vehicle, it is desirable to have the vehicle floor and aisle positioned relatively low to the ground. This provides faster cycle time during stops and facilitates boarding for all passengers, especially for elderly and disabled passengers as well as for children.

Mass transit vehicles typically have several axles that support, drive and steer the vehicle. Many such vehicles provide a rigid axle having an input positioned off-center near one wheel end to form an inverted portal axle configuration. The input to the portal axle rotates about a longitudinal axis and is typically low to the ground to allow the vehicle floor to be as low as possible. The output to the wheels defines a lateral axis that is vertically higher than the longitudinal axis for the input.

This inverted portal axle includes a short axle shaft member that drives the wheel end near the input and a long axle shaft member that drives the opposite wheel end. The portal axle further includes a pair of gear assemblies, one gear assembly positioned at each wheel end, to raise driving input from each of the axle shafts up to the vertically higher output position at the wheels. Typically this gear assembly includes a gear housing, an input gear driven by the respective axle shaft, an output gear for driving the wheel, and a pair of intermediate gears in meshing engagement with the input and output gears.

The output gear drives a wheel shaft that is enclosed within a spindle that is mounted to the gear housing. A wheel hub is mounted for rotation relative to the spindle and receives driving input from the wheel shaft. A brake spider is also mounted to the gear housing to support a brake input member. This traditional configuration incorporates at least three bolted joints and four bearings to support the rotating components. Assembly time and overall component cost is significant due to the large number of components and complexity of this configuration. Also, the large number of components and the fasteners needed for the bolted joints increase the overall weight in the vehicle, which can significantly affect fuel economy.

Accordingly, it is desirable to provide a simplified wheel end assembly for a portal axle configuration to reduce weight, cost, and assembly time in addition to overcoming the other deficiencies in the prior art discussed above.

SUMMARY OF THE INVENTION

A wheel end assembly includes a gear housing with a gear assembly that drives an output shaft. The output shaft is attached to a wheel hub that drives a vehicle wheel. A tube is press-fit into the gear housing and extends into a wheel hub cavity to provide support for wheel bearings. The bearings are mounted directly between the tube and the wheel hub to support the wheel hub for rotation relative to the spindle.

The tube defines a first engagement surface and the gear housing defines a second engagement surface. The first and second engagement surfaces are in contact with each other to create a retaining contact pressure between the tube and the gear housing to prohibit axial movement between the tube and the gear housing.

In the preferred embodiment, the gear assembly includes an input gear driven by an input shaft and an output gear in driving engagement with the output shaft. A set of intermediate gears transfers driving force from the input gear to the output gear. The output shaft is received within the tube with an inboard end splined to the output gear and with an outboard end attached to the wheel hub. Thus, the output gear, the output shaft, and the wheel hub all rotate relative to the tube and gear housing.

In one disclosed embodiment, the gear housing includes a main portion and a cover portion that attach at an interface to define a gear case joint. The gear case joint can be inboard or outboard of the gear assembly depending upon the configuration of the input, output, and intermediate gears. The gear housing includes a main wall with a transversely extending cylindrical portion. The cylindrical portion includes an inboard end that extends inwardly from the main wall toward the gear assembly and an outboard end that extends outwardly from the main wall toward the wheel hub. The cylindrical portion has an inner bore surface that defines the second engagement surface.

The subject invention provides a simplified wheel assembly that significantly reduces weight, assembly time and overall cost. These and other features of the present invention can be best understood from the following specifications and drawings, the following of which is a brief description.

DETAILED DESCRIPTION OF A PREFERRED EMBODIMENT

Figure 1:
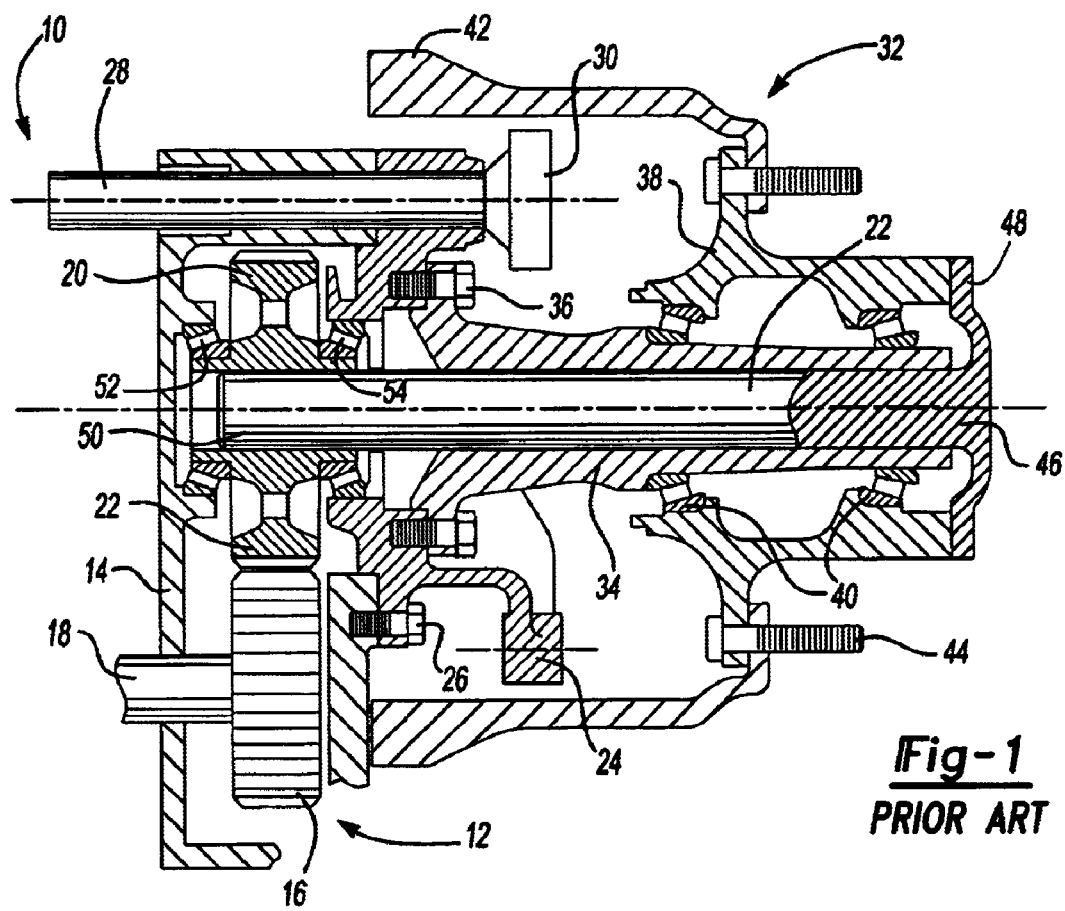
FIG. 1 is a cross-sectional view of a prior art wheel end assembly.

A wheel end assembly for a traditional inverted portal axle configuration is shown generally at 10 in FIG. 1. This traditional wheel end assembly includes a gear assembly 12 including a gear housing 14, an input gear 16 coupled to an input shaft 18, and an output gear 20 for driving an output wheel shaft 22. The gear assembly 12 also includes a pair of intermediate gears (not shown), which react between the input gear 16 and output gear 20 to transfer driving torque from the input shaft 18 to the wheel shaft 22. The input shaft 18 receives driving input from a vehicle engine/transmission via a central gear assembly in an inverted portal axle configuration as known. The inverted portal axle configuration and operation of the gear assembly is well known in the art and will not be discussed in further detail.

A brake spider 24 is bolted to the gear housing 14 with a first plurality of fasteners 26. The brake spider 24 supports a camshaft 28 with a cam 30 at one end for actuating a drum brake assembly 32.

A spindle 34 is bolted to the brake spider 24 with a second plurality of fasteners 36. A wheel hub 38 is mounted for rotation relative to the spindle 34 on a pair of bearings 40. The drum brake assembly 32 includes a brake drum 42 that is bolted to the wheel hub 38 with a third plurality of fasteners 44.

At an outboard end 46, the wheel shaft 22 includes a flanged end 48 that is directly connected to the wheel hub 38. The output gear 20 is splined or similarly attached to the wheel shaft 22 at an inboard end 50. A first bearing 52 provides rotational support between the output gear 20 and the gear housing 14 and a second bearing 54 provides rotational support between the output gear 20 and the brake spider 24.

Figure 2:
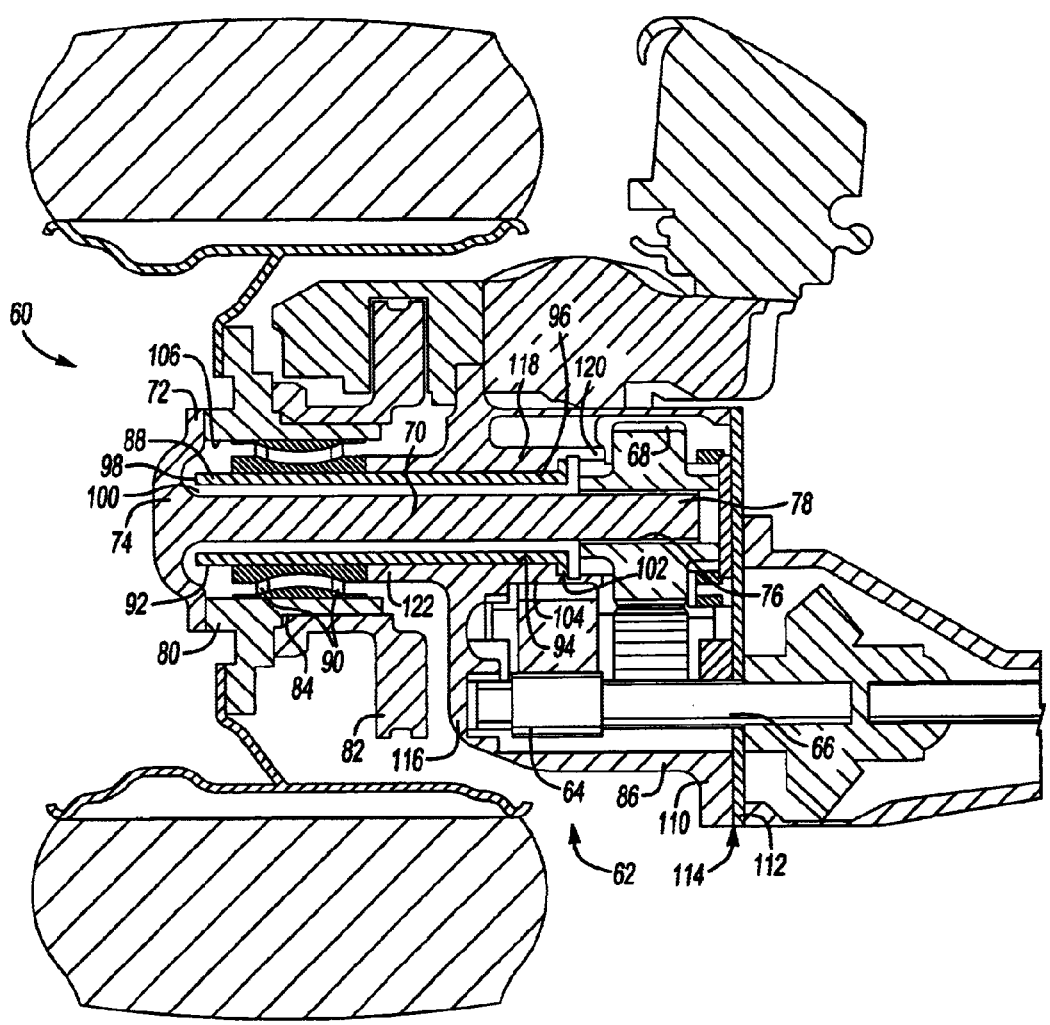
FIG. 2 is a cross-sectional view of a wheel end assembly incorporating the subject invention.

The subject invention provides a simplified wheel end assembly that reduces the overall number of bolted joints and components. A preferred embodiment of a wheel end assembly 60 is shown in FIG. 2. In this embodiment, the wheel end assembly 60 includes a gear assembly 62 with an input gear 64 coupled to an input shaft 66 and an output gear 68 for driving an output wheel shaft 70. The gear assembly 62 also includes intermediary gears for transferring driving force from the input gear 64 to the output gear 68. These intermediary gears are mounted in a unique configuration resulting in a double reduction gear set. This gear set is described in co-pending application "Vehicle Wheel End Assembly With Double Reduction Gear Set" which is assigned to the assignee of the subject application and is herein incorporated by reference.

The wheel shaft 70 includes a flanged portion 72 at an outboard end 74 and a splined portion 76 at an inboard end 78. The output gear 68 is splined or similarly attached to the splined portion 76 and a wheel hub 80 is directly mounted to the flanged portion 72. A brake component 82 is fixed to an outboard external face 84 of the wheel hub 80 for rotation with the hub 80.

The wheel hub 80 is mounted for rotation relative to a gear housing 86 that substantially encloses the gear assembly 62. A tube 88 is press-fit into the gear housing 86 to provide support for a bearing set 90 on which the wheel hub 80 rotates. The tube 88 defines an outer surface 92 that engages an inner surface 94 of the gear housing 86 to create a retaining contact pressure that comprises the press-fit. When the tube 88 is press-fit within the gear housing 86, the tube 88 and gear housing 86 are prohibited from axial movement with regard to each other.

The tube 88 includes an inboard end 96 that is received within the gear housing 86 and an outboard end 98 that extends into a cavity 100 formed within the wheel hub 80. The wheel shaft 70 is received within the tube with the inboard end 78 directly coupled to the output gear 68 and the outboard end 74 directly attached to the wheel hub 80 as described above. The wheel shaft 70, output gear 68, and wheel hub 80 all rotate together relative to the gear housing 86 and tube 88.

An axial reaction member 102 is mounted adjacent to the inboard end 96 of the tube 88 to accommodate axial loading. The axial reaction member is preferably a radial flange portion integrally formed about the inboard end 96 of the tube 88 that engages a corresponding ledge 104 formed within the gear housing 86.

Figure 4:
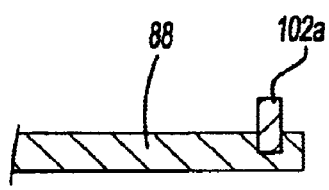
FIG. 4 is a schematic cross-sectional view, of an alternate embodiment of a tube similar to that shown in FIGS. 2 and 3, but including a snap-ring.
Figure 4:
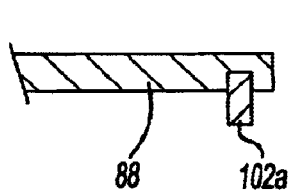

In one option, the tube 88 is retained to the gear housing 86 by a light press-fit and the radial flange portion supports the axial forces. Optionally a snap ring 102a could be used in place of the radial flange potion, as shown in FIG. 4. Another option includes using a higher press-fit force and/or dowels (not shown) to provide the required retention force of the tube 88 within the gear housing 86.

The bearing set 90 preferably includes a pair of tapered roller bearings, which are well known in the art. The bearings 90 are mounted directly between the outer surface 92 of the tube 88 and an inner surface 106 of wheel hub cavity 100. The bearings 90 are both mounted outboard from the gear housing 86.

The gear housing 86 includes a main portion 110 and a cover portion 112 that mounts to the main portion 110 at an interface to define a gear case joint 114. In the embodiment shown in FIG. 2, the gear case joint 114 is positioned inboard of both the input gear 64 and output gear 68. The main portion 110 includes a main wall 116 with a transversely extending cylindrical portion 118. The cylindrical portion 118 includes an inboard end 120 that extends toward the output gear 68 and an outboard end 122 that extends toward the wheel hub 80. An inner bore surface of the cylindrical portion 118 defines the engagement surface 94 that cooperates with the tube 88. In this configuration, the bolted joint is positioned on an inboard side of the gear housing 86.

Figure 3:
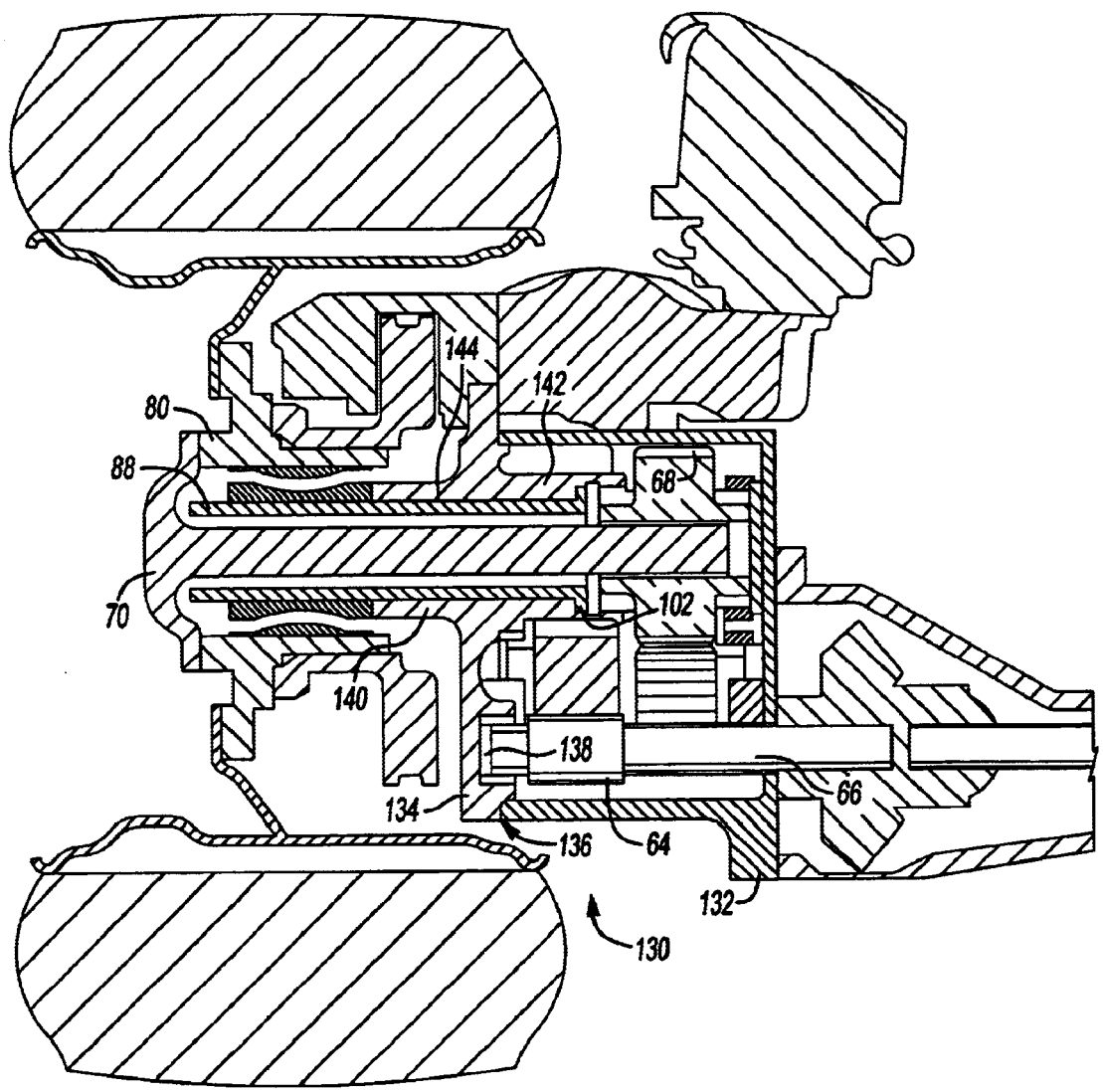
FIG. 3 is a cross-sectional view of an alternate embodiment of a wheel end assembly incorporating the subject invention.

An alternate embodiment of a gear housing 130 is shown in FIG. 3. The gear housing 130 includes a main portion 132 and a cover portion 134 that mounts to the main portion 132 at an interface to define a gear case joint 136. In the embodiment shown in FIG. 3, the gear case joint 136 is positioned outboard of both the input gear 64 and output gear 68. The cover portion 134 includes a main wall 138 with a transversely extending cylindrical portion 140. The cylindrical portion 140 includes an inboard end 142 that extends toward the output gear 68 and an outboard end 144 that extends toward the wheel hub 80. An inner bore surface of the cylindrical portion 140 defines the engagement surface 94 that cooperates with the tube 88. In this configuration, the bolted joint is positioned on the outboard side of the gear housing 130.

Both embodiments eliminate the need for a wheel spindle and a separate bolted joint for attaching the spindle to a gear housing. Instead, a tube 88 is used to provide support for the bearings 90, which allow the wheel hub 80 to rotate. For axles that use disc brakes instead of drum brakes, this unique configuration allows the gear housing 86, 130 to be moved closer to a brake rotor, which in turn provides opportunity for larger floor width on the axle area of a mass transit vehicle. The determination of which embodiment is preferable depends on the particular gear configuration within the gear housing 86, 130.

The subject invention provides a simplified wheel end assembly for an inverted portal axle that reduces weight, assembly time, and overall cost. Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A vehicle wheel end assembly comprising:
   a non-rotating wheel component;
   an output shaft mounted for rotation relative to said non-rotating wheel component;
   a tube partially received within said non-rotating wheel component with said tube having a first engagement surface in contact with a second engagement surface on said non-rotating component such that a retaining contact pressure is created between said tube and said non-rotating wheel component;
   a wheel hub operably driven by said output shaft; and at least one bearing mounted directly between said tube and said wheel hub to support said wheel hub for rotation relative to said tube.

2. An assembly as set forth in claim 1 wherein said retaining contact pressure comprises a press-fit to prohibit said tube from moving axially relative to said non-rotating wheel component.

3. An assembly as set forth in claim 1 including an axial force reaction member reacting between said tube and said non-rotating wheel component to accommodate axial forces.

4. An assembly as set forth in claim 3 wherein said axial force reaction member comprises an outwardly extending radial flange integrally formed about one end of said tube.

5. An assembly as set forth in claim 3 wherein said axial force reaction member comprises a snap ring mounted to one end of said tube.

6. An assembly as set forth in claim 1 wherein said output shaft is received within said tube and includes an inboard end operably coupled to an input shaft and an outboard end operably coupled to said wheel hub.

7. An assembly as set forth in claim 6 wherein said non-rotating wheel component comprises a gear housing substantially enclosing a gear assembly including an input gear driven by said input shaft and an output gear in driving engagement with said output shaft.

8. An assembly as set forth in claim 7 wherein said gear housing includes a main wall with a transversely formed cylindrical portion having an inboard end extending inwardly from said main wall toward said output gear and an outboard end extending outwardly from said main wall toward said wheel hub, said cylindrical portion having an inner bore surface that defines said second engagement surface.

9. An assembly as set forth in claim 1 wherein said at least one bearing comprises a pair of tapered roller bearings mounted directly between said first engagement surface and an inner surface of said wheel hub.

10. An assembly as set forth in claim 1 including a brake component mounted for rotation with said wheel hub.

11. A vehicle wheel assembly comprising:

a gear housing;

a gear assembly mounted within said gear housing and having an input gear operably coupled to an input shaft and an output gear driven by said input gear;

an output shaft in driving engagement with said output gear;

a wheel hub operably coupled to said output shaft for driving a vehicle wheel;

a tube having a first end press-fit into said gear housing and a second end extending into an internal cavity formed within said wheel hub, said output shaft being received within said tube; and a bearing set mounted on said tube for supporting said wheel hub for rotation relative to said tube.

12. An assembly as set forth in claim 11 wherein said tube defines a first engagement surface and said gear housing defines a second engagement surface, said first and second engagement surfaces in contact with each other to create a retaining contact pressure between said tube and said gear housing to prohibit axial movement between said tube and said gear housing.

13. An assembly as set forth in claim 12 wherein said tube includes an outwardly extending radial flange integrally formed about said first end of said tube for accommodating axial forces.

14. An assembly as set forth in claim 13 wherein said gear housing includes a main portion substantially enclosing said gear assembly and a cover portion mounted to said main portion at an interface that defines a gear case joint.

15. An assembly as set forth in claim 14 wherein said gear case joint is inboard of said input and output gears.

16. An assembly as set forth in claim 15 wherein said main portion includes a main wall with a transversely extending cylindrical portion having an inboard end extending inwardly from said main wall toward said output gear and an outboard end extending outwardly from said main wall toward said wheel hub, said cylindrical portion having an inner bore surface that defines said second engagement surface.

17. An assembly as set forth in claim 16 wherein said inboard end of said cylindrical portion includes a ledge in engagement with said radial flange of said tube.

18. An assembly as set forth in claim 14 wherein said gear case joint is outboard of said input and output gears.

19. An assembly as set forth in claim 18 wherein said cover portion includes a main wall with a transversely extending cylindrical portion having an inboard end extending inwardly from said main wall toward said output gear and an outboard end extending outwardly from said main wall toward said wheel hub, said cylindrical portion having an inner bore surface that defines said second engagement surface.

20. An assembly as set forth in claim 14 wherein said bearing set is mounted directly between said first engagement surface and an inner surface of said wheel hub.

21. An assembly as set forth in claim 1 wherein said retaining contact pressure forms the sole attachment interface between said tube and said non-rotating wheel component.

22. An assembly as set forth in claim 6 wherein said input shaft is parallel to said output shaft.

23. An assembly as set forth in claim 11 wherein said input shaft drives said input gear and said output gear drives said output shaft.

24. An assembly as set forth in claim 11 wherein said input shaft is parallel to said output shaft.

25. An assembly as set in claim 12 wherein said retaining contact pressure forms the sole attachment interface between said tube and said gear housing.

* * * * *